United States Patent [19]
Shimizu et al.

[11] Patent Number: 5,552,913
[45] Date of Patent: Sep. 3, 1996

[54] LIQUID CRYSTAL DEVICE AND METHOD FOR PRODUCING THE SAME

[75] Inventors: Michio Shimizu; Toshimitsu Konuma; Takeshi Nishi, all of Kanagawa, Japan

[73] Assignee: Semiconductor Energy Laboratory Co., Ltd., Japan

[21] Appl. No.: 252,199

[22] Filed: Jun. 1, 1994

[30] Foreign Application Priority Data

Jun. 3, 1993 [JP] Japan ..................................... 5-157861
Jun. 8, 1993 [JP] Japan ..................................... 5-164145

[51] Int. Cl.$^6$ ........................ G02F 1/1350; G02F 1/1339
[52] U.S. Cl. ................................ 359/80; 359/51; 359/52; 359/81
[58] Field of Search ............................ 359/26, 54, 522, 359/80, 81, 51, 52

[56] References Cited

U.S. PATENT DOCUMENTS

4,563,059  1/1986  Clark et al. ............................. 350/330
4,640,583  2/1987  Hoshikawa et al. ...................... 359/81

*Primary Examiner*—Wael M. Fahmy
*Assistant Examiner*—Fetsum Abraham
*Attorney, Agent, or Firm*—Sixbey, Friedman, Leedom & Ferguson; Gerald J. Ferguson, Jr.; Karlton C. Butts

[57] ABSTRACT

In a liquid crystal device using a ferroelectric liquid crystal, in the case that a liquid crystal material is injected in a space between a pair of substrates (at least one of the substrates having an alignment film), a liquid crystal mixture of a liquid crystal material and an uncured resin material having a hydrophilicity is injected in the space from an injection inlet formed between the substrates. By the above process, the uncured resin material is remained in the vicinity of the injection inlet, and the space is filled with the liquid crystal material. Subsequently, the resin material is cured to seal the injection inlet. Further, a space between a pair of the substrates is filled with a mixture of the liquid crystal material, the uncured resin material and spacer particles, the liquid crystal material is oriented, the uncured resin material is precipitated from the mixture and cured, and the liquid crystal material and the spacer particles are removed. Subsequently, the liquid crystal material (or a mixture of the liquid crystal material and the uncured resin material) is again injected in the space, the liquid crystal material is oriented, and the uncured resin material is precipitated to be cured.

19 Claims, 5 Drawing Sheets

LIQUID CRYSTAL DEVICE AND METHOD FOR PRODUCING THE SAME

BACKGROUND OF THE INVENTION

1. Field of the Invention

The present invention relates to a liquid crystal device and a method for producing the same. More particularly, the present invention relates to a sealing of a liquid crystal injection inlet in the liquid crystal device using a ferroelectric liquid crystal. Further, the present invention relates to a method for producing a liquid crystal device which can maintain substrates at a constant distance.

2. Description of the Related Art

Recently, a display unit using a liquid crystal has been noted, but in the case where an inexpensive glass substrate or a resin substrate (plastic substrate) is used, it is difficult to enlarge a display area of a liquid crystal display unit. In particular, where the display unit using a nematic liquid crystal is vertically used, deflection occurs in substrates due to a weight of the display unit, and a liquid crystal cell thickness changes because the liquid crystal gathers toward the bottom of the cell due to gravity. As a result, display properties deteriorates. On the other hand, in order to realize a high-speed response of the liquid crystal display unit, a method is considered, which uses a high-speed responsive material such as a ferroelectric liquid crystal as a liquid crystal material.

However, even in the case, for example, where a high-speed response of a liquid crystal display unit is realized by using the ferroelectric liquid crystal as a liquid crystal material, the problem still exists that it is difficult to enlarge a display area of the display unit. The reason for the above is that since the ferroelectric liquid crystal has a layer structure, this layer structure is broken by deformation of substrates, resulting in disturbance on display. This problem is not limited to only in use of the ferroelectric liquid crystal, and basically similar problems occur even in the case of using many other liquid crystal materials.

Further, where such the ferroelectric liquid crystal is used, a problem occurs in a sealing stage after injecting the liquid crystal into a liquid crystal cell. The term "sealing" used herein means that after injecting a liquid crystal into a liquid crystal cell, the injection inlet is closed with a sealing material such as a resin. The sealing intends to prevent entering of ionic substances and to improve a moisture resistance.

A sealing for the nematic liquid crystal is generally conducted such that after injecting a liquid crystal, substrates are pressed from both sides up to a thickness of a liquid crystal cell, and the liquid crystal excessively injected in the liquid crystal cell is pushed out. When the pushing of the liquid crystal cell is stopped in a state that a sealing material contacts the injection inlet, the liquid crystal cell is inflated. Accordingly, the sealing material is sucked and spontaneously advances into an inside of the injection inlet. Subsequently, the sealing material is cured to complete the sealing.

However, since the ferroelectric liquid crystal has a layer structure which is easily broken by pressure or the like, as being different from the case of the nematic liquid crystal, it is impossible to push the liquid crystal cell as described above. Therefore, in the sealing of the ferroelectric liquid crystal device, as the sealing material does not advance into inside of the injection inlet, the injection inlet is closed by covering the sealing material from outside. In this case, however, the sealing material and the substrate are merely contacted, so that the sealing material easily separates from the inlet. Ionic substances and moisture easily enter or permeate from the gap. Thus, reliability of the device cannot be obtained.

Further, a spherical spacer using a material such as silica or plastics is employed to maintain at a constant interval the substrates which hold a liquid crystal used in a liquid crystal display unit. However, such a spacer has a problem in uniformity in scattering the same on the substrate. For example, it is required for the spacers to be uniformly distributed one by one in a scattering liquid, but selection of a solvent and scattering technique therefor are difficult. Even if the spacers can be uniformly scattered on the substrates, since the spacers move when liquid crystal is injected, the spacers are localized in the liquid crystal cell to have ununiformly therein. The ununiform presence of the spacers causes an irregular display, and a pressure to a substrate surface causes disorder in orientation of liquid crystal or layer structure.

To overcome this problem, it is required to use a spacer which does not move at injection of the liquid crystal. However, in a method for fixing the spacers on the substrates by using a material which has an adhesiveness, the type of a solvent selected at scattering the spacers is limited. In addition, orientation disorder tends to occur around the adhesive material.

SUMMARY OF THE INVENTION

An object of the present invention is to improve the reliability of a device by entering a sealing material into an inside of an injection inlet to seal the inlet, reinforcing the sealed portion and preventing entering of ionic substances and moisture, in liquid crystal device using a ferroelectric liquid crystal.

According to one embodiment of the present invention, there is provided a method for producing a liquid crystal device by injecting a mixture of a liquid crystal material and an uncured resin material having a hydrophilicity from an injection inlet formed between a pair of substrates into a space between the substrates, wherein at least one of substrates has/have an aligning material, to remain the uncured resin material in the vicinity of the injection inlet formed between the substrates and to fill a space between the substrates with the liquid crystal material, and then curing the resin material to seal the injection inlet.

According to another embodiment of the present invention, there is provided a liquid crystal device having a ferroelectric liquid crystal material between a pair of substrates wherein at least one of substrates has/have an aligning material, the liquid crystal material is oriented according to the aligning material, and a hydrophilic cured resin material for sealing an injection inlet in the inside of the injection inlet formed between the substrates.

According to still another embodiment of the present invention, there is provided a method for producing a liquid crystal device, which comprises filling a space between a pair of substrates with a mixture of a liquid crystal material, an uncured resin material and spacer particles, orienting the liquid crystal material, precipitating the uncured resin material from the mixture, curing the precipitated uncured resin material, removing the liquid crystal material and the spacer particles, and again injecting the liquid crystal material and the like into the space between the substrates.

According to further embodiment of the present invention, there is provided a method for producing a liquid crystal device, wherein in the above-described method, after filling a space between the substrates from which the liquid crystal material and the spacer particles are removed, with a mixture of the liquid crystal material and the uncured resin, the liquid crystal material is oriented, the uncured resin is precipitated and the precipitated resin is cured.

In order that a material which adheres the substrates each other do not give disturbance in orientation of the surrounding liquid crystal in orienting the liquid crystal while maintaining the substrate at a desired interval, a mixture of the liquid crystal material and the uncured resin is injected into a liquid crystal cell, the liquid crystal material is oriented, and the uncured resin is then precipitated from the liquid crystal material and cured, thereby to form a columnar resin. This columnar resin is called "Polymerized Column Spacer"(hereinafter referred to as "PCS") in the sense of a columnar resin spacer. Since the uncured resin mixed with the liquid crystal material in producing the PCS has a hydrophobicity, the substrates can be adhered without disturbing the orientation of the liquid crystal with fixed intervals. Furthermore, the resin is homogeneously precipitated so that no display irregularity causes.

In a case wherein the uncured resin mixed with the liquid crystal material has hydrophilicity, the uncured resin remains in the vicinity of the injection inlet between the substrates when a mixture of the liquid crystal material and the uncured resin is injected into the liquid crystal cell, and the phenomenon occurs that the uncured resin material cannot substantially be introduced into the liquid crystal cell from the vicinity of the injection inlet.

The present invention positively utilizes this phenomenon, and enables to seal the injection inlet with the resin material in the inside of the injection inlet in a liquid crystal device using a ferroelectric liquid crystal, which has conventionally been difficult to seal.

Even in the case of using the PCS, a spherical spacer is necessary. However, the spherical spacer is so hard and causes orientation defect of the surrounding liquid crystal, and there is the possibility to cause contrast decrease, display irregularity or the like in the display device. Moreover, there is a method wherein a spacer made of an organic resin is formed on a substrate by a technique such as photolithography method or printing method, but the production processes are complicated and the height of the spacers is likely to become ununiform.

The present invention prevents display irregularity or disturbance in orientation of the liquid crystal material by fixing the interval of the substrates without using a so-called granular spacer in producing a liquid crystal device.

BRIEF DESCRIPTION OF THE DRAWINGS

FIG. 1 is a view showing a structure of a liquid crystal device according to the present embodiment before injecting a liquid crystal material and the like;

FIG. 2 is a view showing a structure of a liquid crystal device according to the present embodiment after injecting a liquid crystal material and the like;

DETAILED DESCRIPTION OF THE PREFERRED EMBODIMENTS

The embodiment according to the present invention is explained in more detail by referring to the drawings.
Embodiment 1

Figure 1:
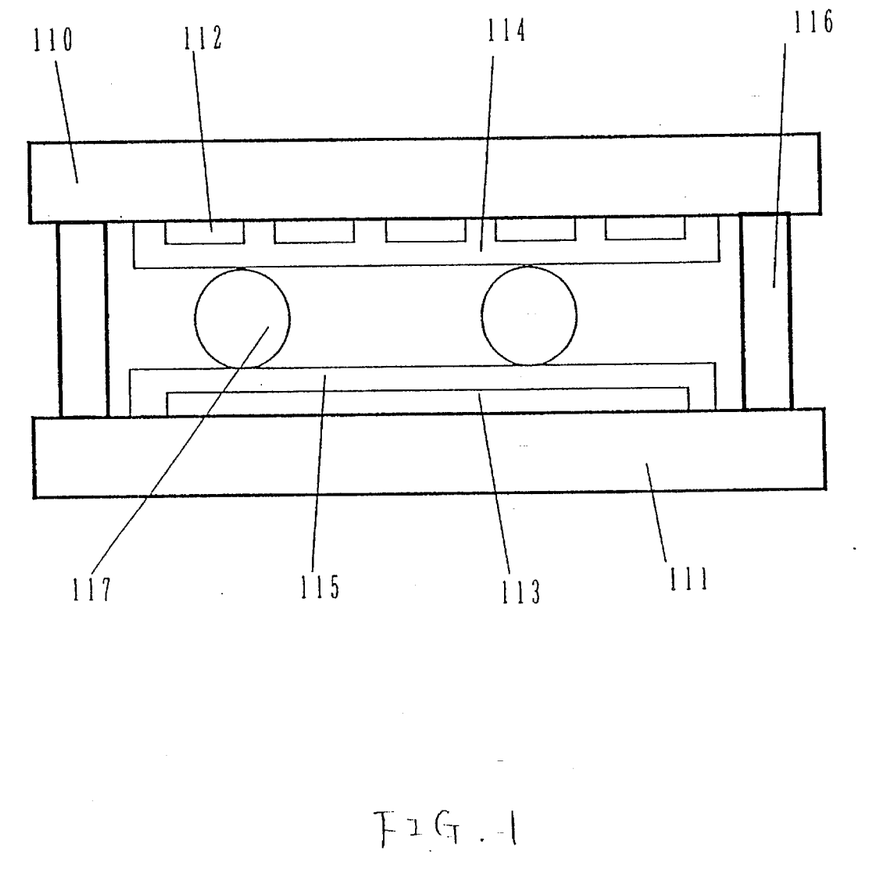

FIG.1 is a view showing the structure of the liquid crystal device according to the present embodiment. A glass substrate having a size of 10×10 cm is used as substrates 110 and 111 shown in FIG.1. A film of indium-tin-oxide (ITO) having a thickness of 1,000 Å is formed on the glass substrates 110 and 111 by a sputtering method, and patterning is conducted with photolithography method to form electrodes 112 and 113. A polyimide is coated at a thickness of 150Å by a spin coating method. After the resulting film is fired at 280° C., a rubbing treatment is performed, thereby forming alignment films 114 and 115 used as aligning means. In the embodiment, "LP-64", manufactured by Toray industries, Inc., is used as the polyimide to be coated. Orientation of the liquid crystal is performed by using the alignment film. However, the orientation of the liquid crystal is performed by a magnetic field orientation method, an oblique evaporation method, a temperature gradient method, a shearing stress method or the like.

In general, in order to inject a liquid crystal into a liquid crystal cell, various factors such as viscosity of the liquid crystal, a state of an alignment film and the like must be considered accordingly. This is also necessary in the case of selecting an optimum pretilt angle as a parameter for determining the orientation of a liquid crystal. This selection can be easily discussed in terms of a wettability between the alignment film and the liquid crystal material, i.e., a numerical value of surface tension.

As a method for measuring the surface tension, there is a contact angle method which calculates the surface tension of an alignment film by dropping a liquid having a different polarity such as pure water or methylene iodide on the formed alignment film and measuring an angle at which the dropped liquid contacts the substrate surface. The surface tension can be separated into a polar term and a non-polar term(also called "dispersion term"). The polar term is generally used as a parameter having a high correlation with a pretilt angle of the liquid crystal. A value of the polar term of the surface tension of the alignment film generally used is about 5–15 dyne/cm.

In general, the larger the adsorbing force of the alignment film against the liquid crystal, the smaller the pretilt angle. In this case, a material having a relatively large surface tension (particularly its polar term having a large value) of the alignment film can be used. On the contrary, where the surface tension of the alignment film is decreased, since a force to adsorb the liquid crystal is small, the pretilt angle tends to become large. If the surface tension of the alignment film is further decreased, it may become impossible to inject the liquid crystal in the liquid crystal cell. This applies, to some extent, to the uncured resin material mixed with the liquid crystal material. Further, the same produces by changing not only the material for the alignment film but also the liquid crystal material to be injected and the surface tension of the resin material.

It is preferred in the embodiment that adsorbability between the alignment film and the liquid crystal material and adsorbability between the alignment film and the resin material, particularly the adsorbability between the alignment film and the resin material, is high. Therefore, if the alignment film to be used is selected and produced by taking this point into consideration, it is easy to control adsorption of the resin in the vicinity of the injection inlet.

After formation of the alignment films, the alignment films 114 and 115 are subjected to the conventional orientation treatment to conduct a uniaxial orientation treatment. True microspheres manufactured by Shokubai (Catalyst) Chemical Co. Ltd. which are silica particles are scattered as a spacer 117 on either the substrate 110 or 111. Furthermore, an epoxy resin-made sealing material 116 is formed on the other substrate by screen printing. Thereafter, those substrates are bonded while maintaining the interval of the substrate at about 1.5 μm. By this procedure, a liquid crystal cell in which the liquid crystal material and the like are not injected can be completed.

The liquid crystal material used in the embodiment is a ferroelectric liquid crystal "CS1014" manufactured by Chisso Corporation. This liquid crystal has Ps of 5.4 $nC/cm^2$ and phase series of I(isotropic phase)-N(nematic phase)-A(smectic phase A)-C(smectic phase C*).

Further, the resin material used in the embodiment is a commercially available ultraviolet curable resin in which an oligomer and a monomer are used as the resin constituting materials, and 1% by weight of a reaction initiator is contained in a mixture of the oligomer and the monomer. Of the resin constituting materials, the oligomer skeleton is mainly adjusted to be hydrophobic or hydrophilic, and four kinds of resin materials having the surface tension varied as shown below, are used.

| Resin Material | Property | Surface Tension (dyne/cm) | Resin Precipitation Position |
|---|---|---|---|
| A | Hydrophilic | 54.0 | Vicinity in inlet |
| B | Hydrophilic | 53.0 | Vicinity in inlet |
| C | Hydrophobic | 43.0 | Entirely in cell |
| D | Hydrophobic | 31.0 | Entirely in cell |

The liquid crystal mixture is obtained by mixing 5% by weight of the resin material and 95% by weight of the liquid crystal mixture. In this case, in order to sufficiently mix the resin in the liquid crystal material, the mixture is stirred while heating at 90° C. until that the liquid crystal shows an isotropic phase.

Figure 2:
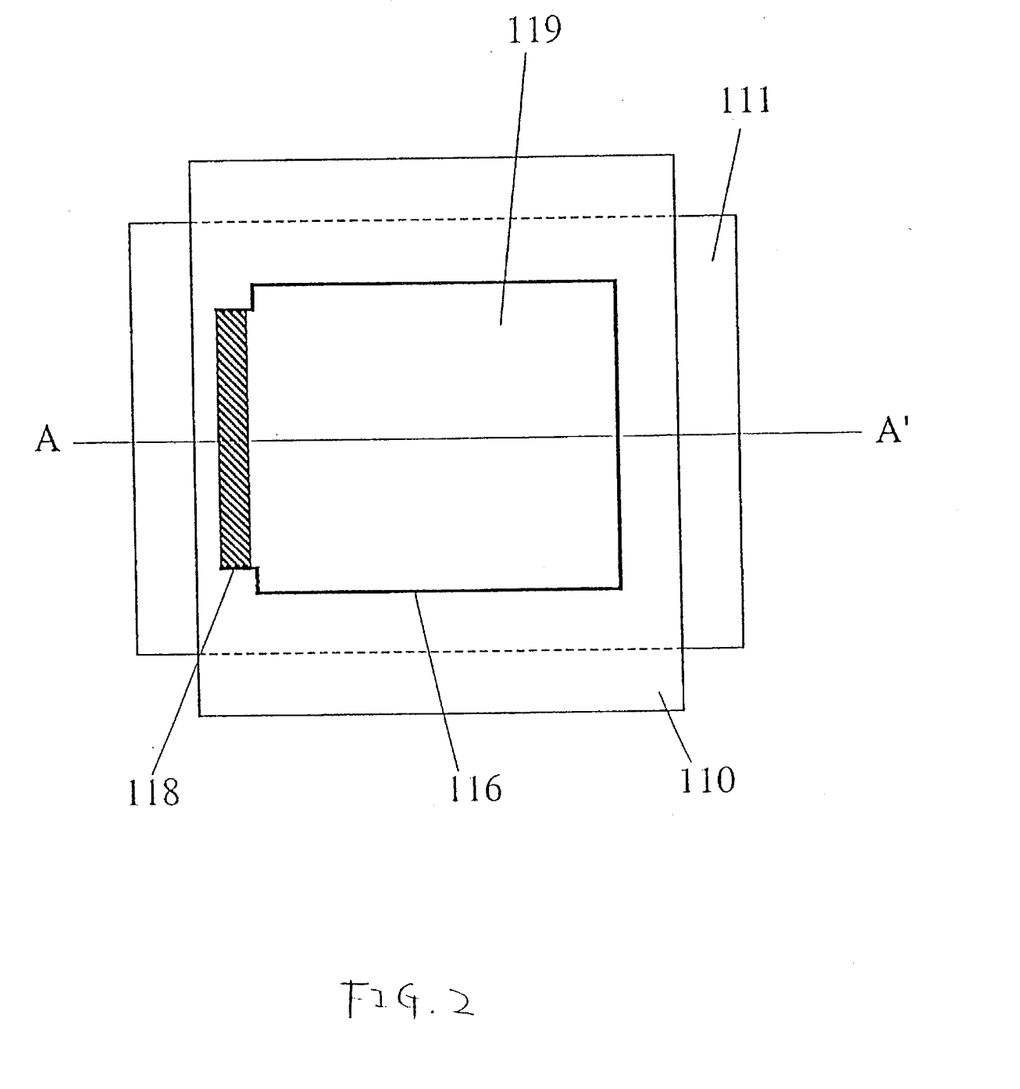
Figure 3:
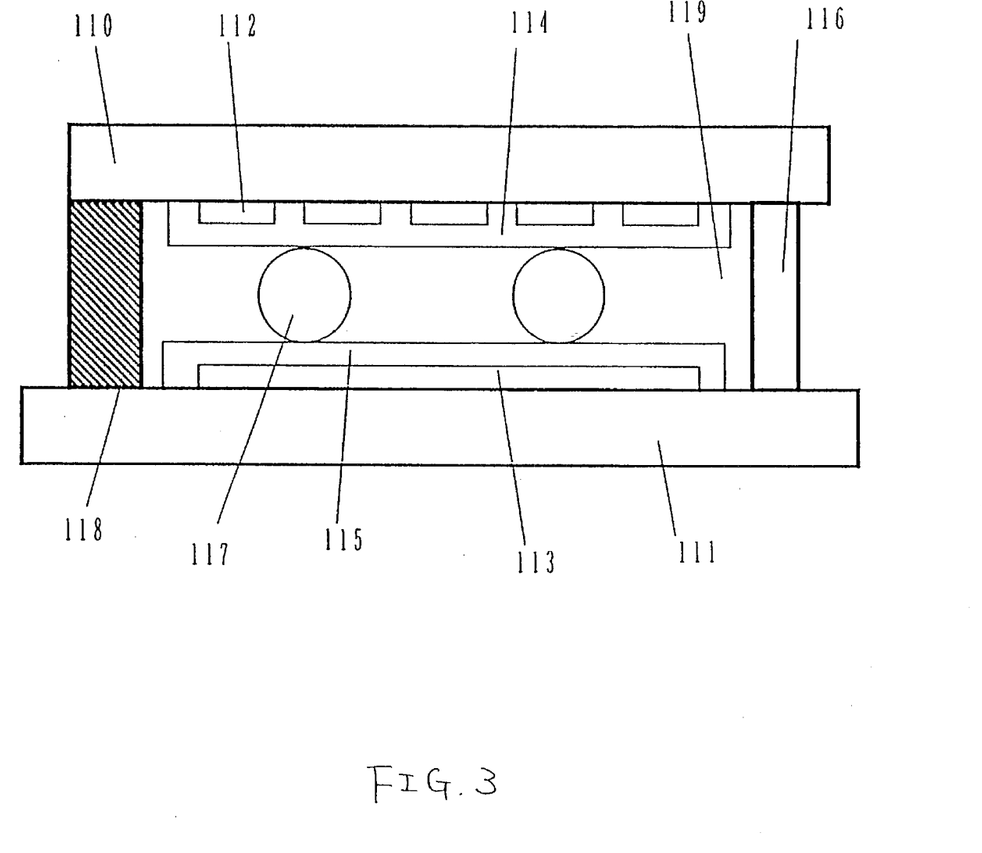
FIG. 3 is a view showing a cross-sectional structure of the liquid crystal device shown in FIG.2.
Figure 4:
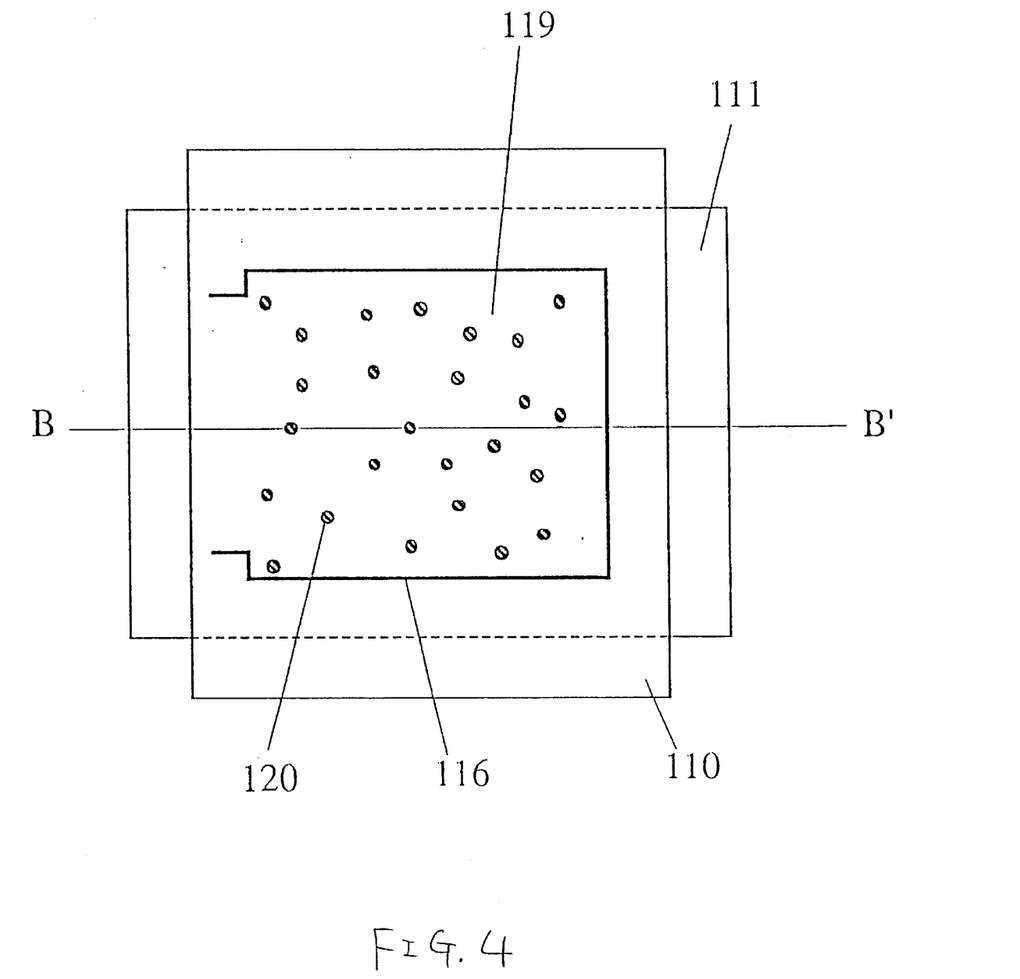
FIG. 4 is a view showing a structure of a liquid crystal device using a resin material having properties different from those of the liquid crystal device shown in FIG.2.
Figure 5:
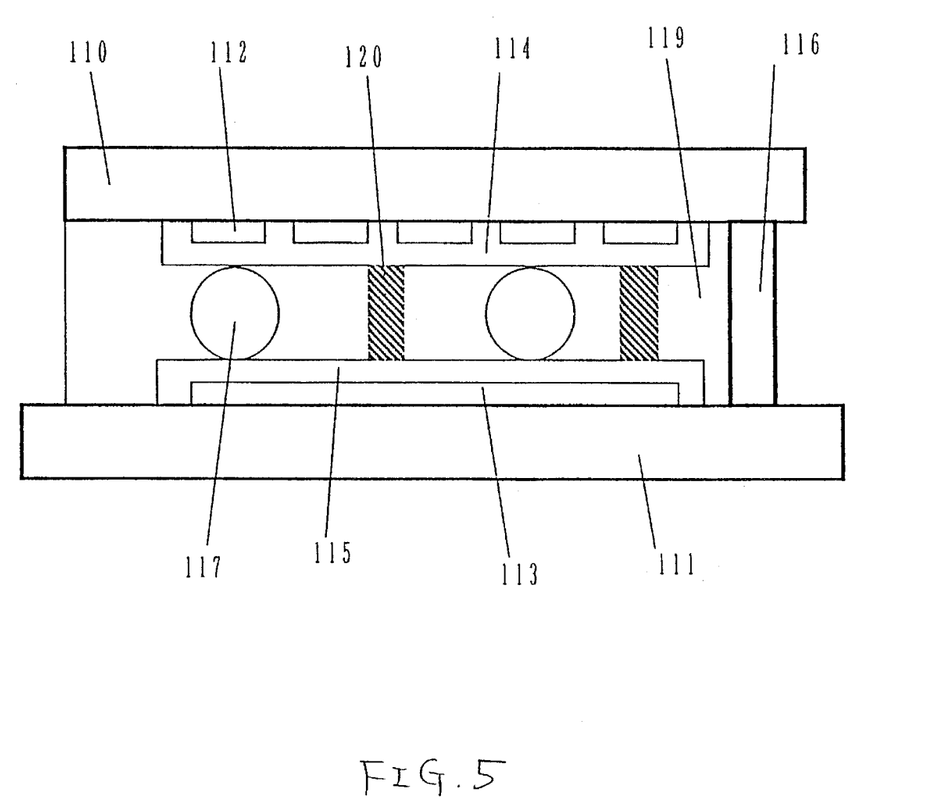
FIG. 5 is a view showing a cross-sectional structure of the liquid crystal device shown in FIG.4.

The resulting liquid crystal mixture is injected into the completed liquid crystal cell (between the substrates). When the liquid crystal mixture is injected, the mixture is gradually cooled from 90° C. to room temperature at a temperature-lowering rate of 2° C./hour under vacuum. As a result, where the hydrophilic resin materials A and B are used, the liquid crystal cell (between the substrates) is filled with liquid crystal material 119 but the resin material 118 is remained in the vicinity of the injection inlet formed between the substrates, as shown in FIGS. 2 and 3 which is a cross-sectional view cut along A–A' in FIG.2. On the other hand, where the hydrophobic resin materials C and D are used, the resin materials 120 are precipitated in the form that the resin materials are removed from the liquid crystal mixture, and are scattered over the entire liquid crystal inside, as shown in FIG. 4 and FIG. 5 which is a cross-sectional view cut along B–B' in FIG.4.

The liquid crystal material 119 is uniaxially oriented similar to the conventional liquid crystal material with which a resin is not mixed. After completion of the orientation treatment, ultraviolet rays are irradiated to cure the resin materials, thereby forming the resin component 118 in the vicinity of the injection inlet formed between the substrates or the columnar resin component 120 scattered. The irradiation conditions of ultraviolet rays have an irradiation intensity of 20 $mW/cm^2$ and an irradiation time for 1 minute.

Where the resin materials A and B are used, the sealing can be conducted with the resin material in the inside of the injection inlet of the liquid crystal cell, but where the resin materials C and D are used, the resin does not solidify in the vicinity of the injection inlet, and it is necessary to conduct the sealing from the outside of the injection inlet.

The liquid crystal cell of the embodiment prepared by sealing the inside of the injection inlet with the resin material A or B is subjected to a reliability test under a closed system at temperature of 55° C. and humidity of 95% for 120 hours, but no change is observed at all. Thus, a good sealing could be conducted. In addition, by covering the outside with a resin, further high reliability could be obtained.

As a result of measurement of optical properties of the liquid crystal cell prepared in the embodiment, a contrast ratio of 100 sufficient as an optical device is obtained.

A liquid crystal mixture of 5% by weight of the hydrophilic resin material A or B, 5% by weight of the hydrophobic resin material C or D and 90% by weight of the liquid crystal material is obtained, the mixture is injected in the liquid crystal cell and the orientation treatment is performed, in the same manners as described above. As a result, both resins which remain in the vicinity of the injection inlet and which scatter over the inside of the liquid crystal cell are present. By curing the resins, the sealing in the inside of the injection inlet and the fixing of the substrate interval with the columnar resin could be conducted in the same process.

In the embodiment, the properties of the resin material mixed are changed, but the resin can remain in the vicinity of the injection inlet by increasing the surface tension of the alignment film present in the vicinity of the injection inlet with ultraviolet ray irradiation, laser light irradiation or the like and controlling the adsorption force of the resin in the vicinity of the injection inlet.

The present invention is explained by the embodiment using a ferroelectric liquid crystal which is greatly influenced by deformation of the substrates (the effect is markedly exhibited), but other liquid crystals can be used in the present invention.

Moreover, the present invention can be applied to not only a simple matrix type liquid crystal device but also an active matrix type liquid crystal device using TFT(Thin Film Transistor) or MIM(Metal Insulator Metal) type element.

The hydrophobic resin material is easy to be compatible with a cyano group and the like of the liquid crystal material, and even if it is mixed with the liquid crystal, the hydrophobic resin material does not easily separate. Therefore, the hydrophobic resin material is easy to be simultaneously injected in the liquid crystal cell, and the PCS can be produced. Contrary to this, by adding a hydrophilic material to the resin material to decrease the hydrophobicity and impart the hydrophilicity, the compatibility of the resin material with the liquid crystal decreases, and even if it is mixed with the liquid crystal, the resin material easily separates.

The hydrophilic resin material and the alignment film are generally absorbable. Further, in a mixture of the liquid crystal material and the uncured resin, since the resin material has a high viscosity as compared with the liquid crystal material even if the mixture is in the heated state for injection, the liquid crystal material tends to preferentially enter into a space between the substrates. Therefore, the resin material remains in the vicinity of the injection inlet formed between the substrates. By curing the remained resin with curing means such as ultraviolet ray or heat, the injection inlet can be sealed in the inside thereof.

According to the present invention, particularly in the case of using a ferroelectric liquid crystal, the sealing can be conducted in the state that the sealing material such as a resin enters up to the inside of the injection inlet. As a result, reinforcement of the sealed portion, entering prevention of ionic substances and entering prevention of moisture (improvement of moisture resistance) can be attained, thereby improving reliability of the device over a long period of time.

Embodiment 2

An ITO film having a thickness of 500–2,000 Å (1,000 Å in the embodiment), as an electrode material, is formed on a glass substrate having a size of 10×10 cm by sputtering method or deposition method, and patterning is conducted with the conventional photolithography method to form electrodes. Two substrates each having a laminate structure are formed as above, and a polyimide is coated on one of the above substrates, firing is performed at 280° C. The polyimide "LP-64" manufactured by Toray Corp. is used. The polyimide film has a thickness of 100–800 Å, 150 Å in the Embodiment. The film is subjected to rubbing treatment to conduct a uniaxial orientation treatment.

The liquid crystal material used in the embodiment is a ferroelectric liquid crystal, CS1014, manufactured by Chisso Corp. The liquid crystal has Ps of 5.4 $nC/cm^2$ and phase series of I(isotropic phase)-N(nematic phase)-A(smectic phase C*). Other nematic liquid crystals and the like can also be used. In addition, the resin material used is a commercially available ultraviolet curable resin.

The liquid crystal material of 97% by weight, the uncured resin material of 3% by weight and a slight amount of true microspheres manufactured by Shokubai Chemical Co., which are silica particles having a diameter of about 1.5 μm, are mixed. In order to sufficiently mix the resin in the liquid crystal material, the mixture are stirred while heating at 90° C. until the liquid crystal shows an isotropic phase. By this procedure, a liquid crystal mixture wherein the resin is uniformly mixed in the liquid crystal material is obtained.

One of the substrates in which a laminate film is formed and the liquid crystal mixture are heated to 90° C., and appropriate amount of the liquid crystal mixture is dropped on the substrate heated, and the other substrate is adhered thereto. The resulting assembly is rapidly cooled to room temperature. The orientation state at room temperature after rapid cooling is observed with a polarized microscope. As a result, silica particles are uniformly dispersed, but disturbance of orientation of the liquid crystal occurs around the silica particles. On the other hand, the resin material is finely scattered in the liquid crystal cell.

The liquid crystal cell is irradiated with ultraviolet ray at an irradiation intensity of 3–30 $mW/cm^2$ and an irradiation time of 0.5–5 minutes (in the embodiment, intensity:20 $mW/cm^2$ and irradiation time: 1 minute) to cure the resin. One substrate is then peeled, and the liquid crystal and the spacers are removed by washing with an alcohol. The substrate in the above state is observed with SEM(Scanning Electron Microscope), and it is confirmed that the columnar resin is scattered over the entire substrate, similar to the observation with the polarizing microscope. The height of the resin is equal to the particle diameter of the silica spacer and is about 1.5 μm.

A sealing material is printed on the substrate from which the liquid crystal and the silica spacer had been removed, or the opposite substrate, those two substrates are bonded, and the sealing material is cured, thereby obtaining a liquid crystal cell having the substrate interval of about 1.5 μm.

A liquid crystal mixture of 98% by weight of the liquid crystal material and 2% by weight of the uncured resin material is stirred while heating at 90° C. until that the liquid crystal shows an isotropic phase. The liquid crystal mixture is injected in the liquid crystal cell obtained above, and gradually cooled to room temperature at a temperature-lowering rate of 2°–20° C./hour (in the embodiment, 2° C./hour). The orientation state at room temperature after cooling is observed with a polarized microscope. As a result, the resin material is scattered over the inside of the liquid crystal cell, and the liquid crystal around the resin is uniaxially oriented along the rubbing direction of the alignment film, similar to the liquid crystal to which the resin is not added, whereby a good extinction position is obtained.

In the case that the transmission properties when a triangular wave of ±30 V and 5 Hz is applied to the liquid crystal cell are shown in optional values, a light state value is 154, a dark state value is 1.95, and a contrast ratio is 79. The embodiment employs the method that a mixture of the liquid crystal material, the uncured resin, and the spacer particles is dropped on one of the substrates, two substrates are bonded, the resin is cured, one of the substrates is peeled from the other substrate, the liquid crystal and the spacer are removed, the two substrates are again bonded, and the liquid crystal mixture is injected in a space between the substrates. However, a method can be employed that after removing the liquid crystal material and the spacer, the liquid crystal material (or a mixture of the liquid crystal material and the uncured resin) is dropped on one of the substrates, and the two substrates are bonded.

Further, in a liquid crystal device obtained by injecting a liquid crystal mixture of 98% by weight of the liquid crystal material and 2% by weight of the uncured resin material in the liquid crystal cell using only the silica spacer, precipitating the columnar resin and then curing the columnar resin, disturbance of orientation of the liquid crystal is present around the silica spacer particles, and passing of the light is observed. In the case that the transmission properties of the liquid crystal cell are shown in optional values, a light state value is 154, a dark state value is 3.00, and a contrast ratio is 51.

In the present invention, any material can be used as the liquid crystal material in forming the columnar resin in the state that the spacer is present between the substrates. Furthermore, the liquid crystal material at reinjection can be the liquid crystal alone or a mixture of the liquid crystal material and the uncured resin. In this case, since the resin is again formed into a columnar shape, the substrate peeled can be again adhered by the columnar resin, and the substrate interval does not enlarge even if a liquid crystal device having a large area is prepared. In addition, even if a trace of the spacer is left on the portion form which the spacer has been removed, the trace can be embedded with the resin, thereby further preventing disturbance of the orientation.

A shape of the columnar resin is substantially determined by phase series of the liquid crystal or rate of gradual cooling. Where the liquid crystal has the phase series of I-A-C, the resin has a shape of a quadrangular prism, and where the liquid crystal has N phase such as I-N-A-C, the resin tends to have a shape of a column.

In order to easily form the first columnar resin, it is recommended to use a resin which adheres to one of the substrates but easily peels. For example, a substrate of an organic resin such as polyethylene terephthalate (PET) may be used as a substrate to be peeled, or a film of an organic resin is formed on the surface of the substrate.

The present invention forms the PCS such that the height of the columnar resin equals to the interval of the substrates, by precipitating and curing the uncured resin mixed with the liquid crystal material under the state that the substrate interval is determined by the spacer particles. Thereafter, the liquid crystal material and the spacer are removed, and the liquid crystal material is again injected in a liquid crystal cell in which only the columnar resin determines the substrate interval.

Further, the present invention uniformly forms fine columnar resins each having the same height in a space between the substrates, and avoids existence of the spacer such as silica particles therein. Since the columnar resin adheres to at least one of the two substrates, the columnar resin does not move. Further, since the columnar resin has a shape corresponding to the orientation state of the liquid crystal, the resin does not disturb the orientation of the liquid crystal. Therefore, display irregularity caused in the case of using the spacer particles or disturbance of orientation of the liquid crystal material can be prevented.

In addition, the liquid crystal cell can be produced with a reliable accuracy by extremely easy processes, and the productivity is also high.

While the invention has been described in detail and with reference to specific embodiment thereof, it will be apparent to one skilled in the art that various changes and modifications can be made therein without departing from spirit and scope thereof.

What is claimed is:

1. A method for producing a liquid crystal device, comprising the steps of:

injecting a mixture of a liquid crystal material and an uncured resin material having a hydrophilicity from an injection inlet formed between a pair of substrates, to hold the uncured resin material in a vicinity of an inside of the injection inlet and fill a space between the substrates with the liquid crystal material, and curing the uncured resin material, to seal the injection inlet, wherein aligning means for orienting the liquid crystal material is formed on at least one of the substrates.

2. The method of claim 1, wherein the step for curing the uncured resin material comprises a step for irradiating the uncured resin material with ultraviolet ray.

3. The method of claim 1, wherein the liquid crystal material comprises a ferroelectric material.

4. A method for producing a liquid crystal device, comprising the steps of:

injecting a mixture of a liquid crystal material and an uncured resin material from an injecting inlet formed between a pair of substrates;

irradiating an alignment film placed in a vicinity of an inside of the injection inlet with a radiation, to hold the uncured resin material in the vicinity of the inside of the injection inlet and fill a space between the substrates with the liquid crystal material; and curing the uncured resin material, to seal the injection inlet.

5. The method of claim 4, wherein the radiation comprises a ultraviolet ray or a laser beam.

6. The method of claim 4, wherein the step for curing the uncured resin material comprises a step for irradiating the uncured resin material with ultraviolet ray.

7. The method of claim 4, wherein the liquid crystal material comprises a ferroelectric material.

8. The method of claim 4, further comprising a step for orienting the liquid crystal material.

9. A method for producing a liquid crystal device, comprising the steps of:

injecting a mixture of a liquid crystal material, an uncured resin material having a hydrophilicity and an uncured resin material having a hydrophobicity from an injection inlet formed between a pair of substrates, to hold the uncured resin material having the hydrophilicity in a vicinity of an inside of the injection inlet and fill a space between the substrates with the liquid crystal material;

orienting the liquid crystal material filled in the space;

scattering and precipitating the uncured resin material having the hydrophobicity in the space; and curing the uncured resin material having the hydrophilicity and the uncured resin material having the hydrophobicity.

10. The method of claim 9, wherein the step for curing the uncured resin materials comprises a step for irradiating the uncured resin materials with ultraviolet ray.

11. A method for producing a liquid crystal device, comprising the steps of:

filling a space between a pair of substrates with a mixture of a liquid crystal material, an uncured resin material and spacer particles;

orienting the liquid crystal material;

precipitating the uncured resin material from the mixture;

curing the precipitated uncured resin material;

removing the liquid crystal material and other spacer particles from the mixture; and filling the space with another liquid crystal material.

12. The method of claim 11, wherein the step for curing the uncured resin material comprises a step for irradiating the uncured resin material with ultraviolet ray.

13. The method of claim 11, wherein the step for curing the uncured resin material comprises a step for heating the uncured resin material.

14. The method of claim 11, further comprising the steps of:

filling an uncured another resin material;

orienting the filled another liquid crystal material;

precipitating the uncured another resin material; and curing the precipitated uncured another resin material.

15. The method of claim 11, wherein the removing step comprises a step of peeling one of the substrates from the other substrate.

16. A method for producing a liquid crystal device having a pair of substrates, wherein a liquid crystal material is held in a space between the substrates, the method comprising the steps of:

orienting the liquid crystal material; and performing at the same process a sealing of an injection inlet which is formed between the substrates and from which the liquid crystal material is injected to the space and maintaining of a substrate interval of the substrates, wherein a hydrophilic resin material and a hydrophobic resin material are mixed with the liquid crystal material.

17. The method of claim 16, wherein the liquid crystal material comprises a ferroelectric material.

18. The method of claim 16, wherein the sealing of the injection inlet is performed by the hydrophilic resin material mixed with the liquid crystal material, and the maintaining of the substrate interval is performed by the hydrophobic resin material mixed with the liquid crystal material.

19. The method of claim 16, wherein each of the hydrophilic resin material and the hydrophobic resin material are a resin curable by an ultraviolet ray.

* * * * *